Nov. 29, 1966 P. BOUTELANT 3,289,113

NON-RECIPROCAL ATTENUATION EQUALIZATION NETWORK USING CIRCULATOR HAVING PLURAL MISMATCHED PORTS BETWEEN INPUT AND OUTPUT PORT

Filed March 18, 1964

INVENTOR
Paul Boutelant
By: Paul M. Craig, Jr.
ATTORNEY

United States Patent Office 3,289,113

Patented Nov. 29, 1966

3,289,113

NON-RECIPROCAL ATTENUATION EQUALIZATION NETWORK USING CIRCULATOR HAVING PLURAL MISMATCHED PORTS BETWEEN INPUT AND OUTPUT PORT

Paul Boutelant, Bobigny, France, assignor to Compagnie Generale d'Electricite, Paris, France, a corporation of France Filed Mar. 18, 1964, Ser. No. 352,806
Claims priority, application France, Mar. 21, 1963, 928,787
20 Claims. (Cl. 333—28)

The present invention relates in general to a transmission system for very high and ultra-high frequency electric waves and more particularly to an adjustable attenuation network, the attenuation characteristic of which is dependent upon the frequency of the applied electric wave in a predetermined manner.

More particularly, the present invention relates to a two-part attenuation equalizer network for very high or ultra-high frequency electric waves having an attenuation dependent upon frequency, which is designed to be inserted in a transmission system having a transmission factor which varies as a function of the frequency in an undesirable manner owing to the characteristics of certain of its components.

The attenuation equalizer network of the invention may, in particular, be used as a correcting device to compensate for the undesirable variations in the transmission factor of such a transmission system.

It is known that, in very high and ultra-high frequency electrical wave transmission systems in particular, certain components, such as, for example, "maser" amplifiers, bring about a wave form distortion in the transmitted wave due to the fact that the gain of these devices is not constant over their entire useful frequency band, but decreases rather quickly in the vicinity of the lower and upper limits of said band. This is particularly detrimental in frequency modulation transmission systems.

In order to overcome this drawback, it is known to associate such components with an equalizer network whose attenuation variation characteristic is the complement of the characteristics of said components so as to obtain an overall transmission factor for the transmission system which is as nearly constant as is possible.

According to a technique transposing into the ultra-short wave field the method used in the low-frequency range which employs equalizers consisting of a hybrid coil connected to two impedances whose value is dependent upon frequency, it is known that such a network can be achieved by connecting two impedances to two of the four ports of a differential coupler of the type generally known as a "magic-T" and by connecting the other two ports of the differential coupler to the input and output of the network, respectively. The impedances concerned usually consist of cavity resonators tuned to the mid-band frequency $f_0$ of the passband and suitably damped.

However, such a device, though theoretically satisfactory, has in practice a serious limitation. It has been found that the device using a differential coupler significantly deviates from a perfect operation whenever the band of frequencies used is comparatively wide. In other words, this device of the prior art is strictly a narrow band device, which works satisfactorily over a narrow band of frequencies, but is very unsatisfactory in its operation when the applied frequency extends outside of this narrow band.

The attenuation equalizer network according to the present invention does not exhibit this disadvantage. Its principle consists in using, as a means of attenuation, the reflection of the applied electric waves to be transmitted on at least one partially resistive and partially reactive impedance arranged at the end of a short section of transmission line or wave-guide.

It is known that, under these conditions, the reflection of the wave is carried out with an attenuation which is dependent upon the complex ratio of the impedance value concerned to the wave-impedance of the line or guide, and this is dependent, according to the behavior of said complex ratio as a function of frequency, upon the frequency of the applied wave.

The various embodiments of the devices of the invention make use of known unidirectional devices which connect the input and output of the attenuation equalizer to the input end of the above-said short line sections connected to the said impedance or impedances, with such an orientation that the waves reflected at the other end of said section or sections will not return to the equalizer input but will be propagated only toward the output of the equalizer. In such systems several successive reflections can be achieved. In each case the nature and dimensioning of the corresponding complex impedance or impedances may be chosen according to the magnitude of the desired attenuation and according to the attenuation vs. frequency variation characteristic to be obtained in the desired frequency band.

The system according to the instant invention thus makes it possible to build an electric wave transmission network whose attenuation is dependent upon the applied frequency within a desired frequency band having a center frequency $f_0$. The transmission network of the invention is designed to be inserted between an incoming transmission line and an outgoing transmission line. It makes use of one or more complex impedances of variable value in the said frequency band and is characterized in that it comprises a circulator having $n$ ports of respective ranks 1 to $n$ and such that the wave transmission be possible in only a single direction from each port directly to the port of next higher order. The incoming and outgoing transmission lines are connected to ports 1 and $m$, respectively ($m$ being at most equal to $n$), while each of the intermediate ports between 1 and $m$ is closed on a corresponding complex impedance, and in case $m$ should be lower than $n$, at least the port of rank $(m+1)$ among the ports having ranks higher than $m$ is closed on a termination impedance without reflection.

The circulator used with the instant invention may be of any conventional type and may, for example, be of the type which utilizes a plurality of unidirectional devices having a single input and a single output connected end to end in the well-known manner. In one application of the invention, the circulator utilized is of the three-port type. In another application, the circulator comprises four ports, two of which being connected to two complex impedances respectively. In general, the transmission lines used are wave-guides or coaxial lines and the complex impedances comprise one or more cavity resonators. Each of the cavity resonators utilized with the invention has a resonant frequency approximately equal to $f_0$, the center frequency of the useful band of the transmission system, and one of these resonators at least is associated with an adjustable damping resistance, and, when required, with an adjustable reactance designed to compensate for the faults peculiar to the resistances used in the ultra-short wave frequency range, the practical properties of which considerably deviate from those of pure resistances.

In a particular application of the present invention, at least one of the complex impedances consists of the input impedance of a bandpass filter formed by a wave-guide in which cavity resonators tuned approximately to the frequency $f_0$ are inserted, the wave-guide being closed at its output on a damping resistance which is preferably adjustable.

In another application of the invention which also uses the input impedance of a bandpass filter, the latter is formed by a wave-guide to which cavity resonators tuned approximately to the center frequency $f_0$ of the effective band are connected laterally, at regular intervals. The couplings are achieved by means of slots or holes arranged in a lateral wall of the guide. In this instance, the above-mentioned intervals can be equal to an odd multiple of a quarter-wave length of the wave transmitted in the guide, the latter being terminated at its far end on adjustable resistance as in the other embodiments.

In accordance with a preferred embodiment of the invention, the circulator can be formed by a "Y-junction" of the type well-known in the wave-guide art, incorporating in its center a ferro-magnetic element subjected to a permanent magnetic polarization field.

Accordingly, it is an object of the present invention to provide a transmission system for electrical signals of the type described hereinabove which avoids by extremely simple and operationally effective means the shortcomings and drawbacks encountered with the prior art constructions.

Another object of the present invention resides in the provision of a transmission system of electrical signals provided with a variable attenuation network that produces variable attenuations with the frequency of the applied signals according to a predetermined law over a comparatively wide frequency band.

Still another object of the present invention resides in the provision of a transmission system for electrical signals, especially for frequency modulated electric signals, which compensates in a completely satisfactory manner for the non-uniform gain of certain high frequency wave transmission components with variations in frequency.

A further object of the present invention resides in the provision of a transmission system for electrical signals which includes a variable attenuation compensating network whose attenuation variation characteristic accurately compensates for the variable gain characteristic of certain high frequency transmission components.

A further object of the present invention resides in the provision of an electrical signal transmission system which is simple in construction, utilizes relatively few parts, is easy to assemble and adjust in operation, and assures the aims and objects mentioned hereinabove.

These and other objects, features, and advantages of the present invention will become more obvious from the following description when taken in connection with the accompanying drawing which shows, for purposes of illustration only, several embodiments in accordance with the present invention, and wherein.

Figure 1:
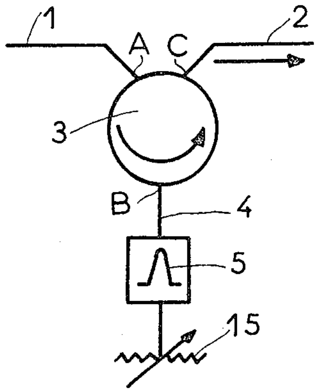
FIGURE 1 is a schematic diagram of a first embodiment of a network in accordance with the present invention in its most general form.

Referring now to the drawing wherein like reference numerals are used throughout the various views to designate like parts, and more particularly to FIGURE 1 which is a schematic view of a network in its most general form, reference numeral 1 designates in this figure the schematically indicated input wave-guide, connected to the terminal or port A of a conventional circulator 3. Reference numeral 2 designates in this figure the output wave-guide connected to terminal or port C of the circular 3, and reference numerals 5 and 15 designate a complex impedance connected, through a section of wave-guide 4 to the terminal or port B of the circulator 3. While only one terminal of the circulator is shown having a complex impedance connected thereto, it should be understood that several terminals between the input and output of the circulator may be provided with such an impedance to produce a particular attenuation characteristic, subject to the circulator having a corresponding number of ports higher than three.

The complex impedance can be formed in particular by cavity resonator 5 tuned to the frequency $f_0$ and coupled to the outer end of the connecting wave-guide 4 by means of any known device, such as, an iris, a slot or a coupling hole. A resistance 15 is used to regulate the damping of the cavity resonator 5, and provides a basis for the adjustment of the attenuation of the device in a manner which will become clearer as this discussion proceeds.

If $f$ is the frequency of a wave ranging within the band pass whose center frequency is $f_0$ and if $x$ has the value $(f/f_0-f_0/f)$, one may readily demonstrate that the attenuation $A_f$ (at frequency $f$) introduced by the reflection of the wave on the termination 5, 15 of wave-guide 4 may be approximately represented by the relationship $$A_f=A_0-K(1+ax^2) \text{ decibels} \qquad (1)$$

where $A_0$ and K are constants dependent upon the damping factor of cavity 5 which is, in turn, dependent upon the resistance value of resistance 15 as well as upon the coupling degree between cavity 5 and the wave-guide 4. The quantity $a$ is also dependent upon the degree of coupling between the cavity 5 and the wave-guide 4.

The specific attenuation of the wave-guide section 4 is practically negligible if this section is short, and the specific attenuation of the circulator is generally low and independent of the frequency in its normal passband.

The equation 1 indicated above shows that the attenuation $A_f$ varies symmetrically with the frequency on either side of the center frequency $f_0$, and that by choosing the value of $a$, it is possible to affect the magnitude of $A_f$ and the rapidity of its variation as a function of the frequency applied. As indicated in the relationship, $A_f$ is maximum when $f$ is equal to $f_0$ and decreases on both sides of the center frequency in an essentially logarithmic manner. This is quite useful when it is desirable to compensate for reduction in gain towards either of the limits of the useful frequency band of certain amplifying devices as already mentioned, by providing a complementary attenuation characteristic.

Figure 2:
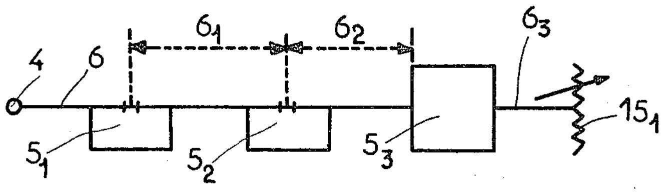
FIGURE 2 is a schematic diagram of a bandpass filter arrangement in accordance with the present invention for use with the network of FIGURE 1.

If one wishes to obtain an attenuation variation which is slight when frequency deviation $(f-f_0)$ is small (this deviation is approximately equal to $f_0x/2$), and then provide a more substantial increase as $x$ increases, it is possible in the arrangement according to FIGURE 1 to substitute for the cavity resonator 5 and the resistance 15 a more complex device, such as the one illustrated in FIGURE 2.

The device according to FIGURE 2 is formed by a bandpass filter consisting of two or more cavity resonators such as $5_1$ and $5_2$ coupled at regular intervals along a guide 6 formed by a set of guide sections, such as $6_1$ and $6_2$. The last of these guide sections is then terminated in a cavity resonator $5_3$. Each of the cavity resonators $5_1$, $5_2$ and $5_3$ is tuned to the frequency $f_0$, and exhibit, together with guide 6 appropriate degrees of coupling. The cavity resonator $5_3$ is also connected through a section of guide $6_3$ to an adjustable resistance $15_1$.

In the bandpass filter illustrated in FIGURE 2, in order to obtain an attenuation whose variation is comparatively slight in the vicinity of frequency $f_0$ and increases to a greater extent toward the limits of the frequency band, sections $6_1$ and $6_2$ of the guide are given a length which is approximately equal to $(2k+1)$ times one-fourth of the phase wave length along guides $6_1$ and $6_2$, where $k$ is any integer. In other words, the desirable attenuation characteristic can be obtained with the bandpass filter of FIGURE 2 if the cavity resonators are spaced along the guide by a distance equal to an odd multiple of a quarter wave length of the frequency $f_0$.

Figure 3:
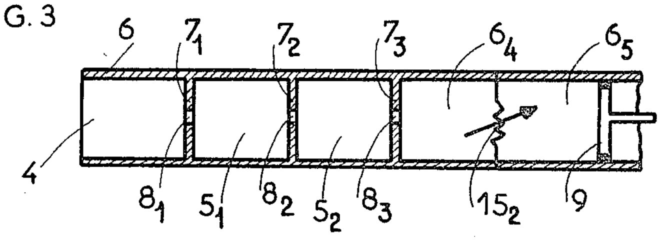
FIGURE 3 is a schematic diagram of still another bandpass filter arrangement in accordance with the present invention which may also be used with the network of FIGURE 1.

In another possible design of the bandpass filter illustrated in FIGURE 2 for replacing the cavity resonator 5 and resistance 15 in FIGURE 1, FIGURE 3 illustrates a filter similar to that of FIGURE 2 which is formed in the wave-guide itself by conducting walls such as $7_1$, $7_2$ and $7_3$ bounding cavity resonators $5_1$ and $5_2$ which are interconnected and connected to the guide through apertures $8_1$, $8_2$ and $8_3$. The end 4 of guide 6 in FIGURE 3 is connected to port B of the circulator 3, while its opposite end is connected through a section of guide $6_4$ to an adjustable resistance $15_2$, connected in parallel with which is arranged a section of guide $6_5$ terminated in a short circuit piston 9. The purpose of this arrangement is to eliminate the faults peculiar to resistance $15_2$, which often exhibits an undesirable reactance. This can be compensated for by correctly choosing the length of guide section $6_5$ which may be determined by proper positioning of the piston 9.

The dimensions of the cavity resonators $5_1$ and $5_2$ and the coupling apertures $8_1$, $8_2$ and $8_3$ are chosen as a function of the frequency $f_0$, in the manner required for the resonance of the cavities, for the desired rate of variation of the attenuation in the vicinity of the frequency $f_0$.

Figure 4:
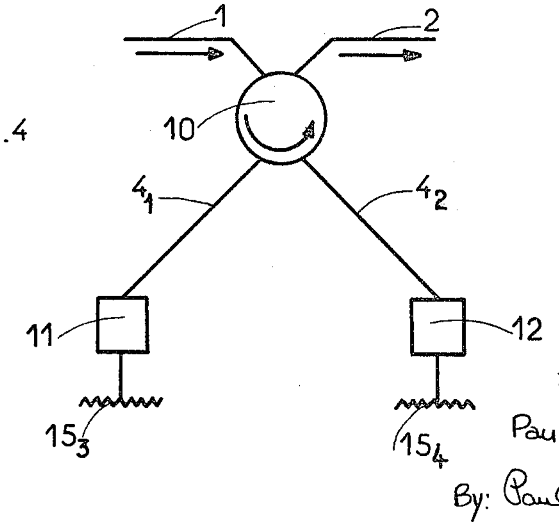
FIGURE 4 is a schematic diagram of a modified embodiment of the network in accordance with the present invention.

The present invention also provides an alternative to the system of FIGURE 1, which is illustrated in FIGURE 4. This alternative system uses a four-port circulator 10, having two of its ports connected to the input and output guides 1 and 2, respectively, and having its other ports connected through guide lengths $4_1$ and $4_2$ to a pair of cavity resonators 11 and 12, both of which are tuned to the frequency $f_0$ and are damped by adjustable resistances $5_3$ and $5_4$, respectively. This particular arrangement has the advantage that it is very easily adjustable, since the resistances $15_3$ and $15_4$ may be separately adjusted.

Of course, many alternatives regarding the applications of the present invention can be considered according to the specific attenuation characteristic as a function of frequency which is desired.

By way of example, in the system illustrated in FIGURE 4, it is possible to utilize two cavity resonators 11 and 12 which are respectively tuned to two frequencies $f_1$ and $f_2$, falling on either side of the center frequency $f_0$ of the frequency range. It is possible to obtain an attenuation curve having two maxima, one of which is in the vicinity of $f_1$, the other in the vicinity of $f_2$. It is therefore possible to produce a double-humped attenuation characteristic in which two maxima are present and in which the two maxima may be either of equal or inequal amplitude depending upon the proper choice of the frequencies $f_1$ and $f_2$ and the coupling coefficients of the corresponding cavities to the wave-guide portions which connect the same respectively to the circulator 10.

One could also, in a case not illustrated by the several figures of the drawing attached hereto, utilize for example, in the system illustrated in FIGURE 4, the particular bandpass filter arrangements illustrated in FIGURES 2 and 3 for the cavity resonators 11 and 12 and the resistances $15_3$ and $15_4$, respectively.

Other alternatives to be chosen according to the law of variation desired for the attenuation as a function of the frequency, as well as the magnitude of this attenuation, the number of cavity resonators and the complexity of the circulator economically permissible will be clearly apparent to one of ordinary skill in the art.

While I have shown and described several embodiments in accordance with the present invention, it is understood that the same is not limited thereto but is susceptible of numerous changes and modifications as known to a person skilled in the art, and I, therefore, do not wish to be limited to the details shown and described herein, but intend to cover all such changes and modifications as are encompassed by the scope of the appended claims.

I claim:

1. An equalizer network producing attenuation of electric wave signals applied therethrough within a frequency band having a mid-frequency $f_0$, said network being adapted to be inserted between an input transmission line and an output transmission line and comprising of circulator having a number $n$ of ports of respective ranks 1 to $n$ and so arranged that transmission of said signals be possible only unidirectionally from any one of said ports having a given rank to that of said ports having the rank immediately higher than said given rank, means for connecting said input line to that of said ports having rank 1, means for connecting said output line to that of said ports having rank $m$, and a plurality in number $(m-2)$ of complex impedances each having a resistive part and a reactive part in said frequency band and respectively connected to the ports of ranks intermediate 1 and $m$, each of said complex impedances having such a value as to mismatch the output wave impedance of said circulator at that of latter said ports connected thereto at any frequency within said band and to an extent which is a predetermined function of latter said frequency, and all of said complex impedances being passive independent-of-time impedances.

2. An equalizer network according to claim 1, in which $n$ and $m$ are both equal to three.

3. An equalizer network according to claim 2, in which said circulator consists of a Y-junction provided in its central portion with a piece of ferromagnetic material submitted to a permanent magnetic polarization field.

4. An equalizer network according to claim 1, in which $n$ is larger than $m$ and in which among the ports of ranks higher than $m$ at least the port of rank $(m+1)$ is closed on a reflectionless termination.

5. An equalizer network according to claim 1, in which said circulator is made of a plurality of series-arranged unidirectional devices each having a single input and a single output and each of which has its output connected to the input of the next one.

6. An equalizer network according to claim 1, in which $m$ and $n$ are both equal to four, and in which two of said complex impedances are respectively connected to ports of ranks 2 and 3.

7. An equalizer network according to claim 1, in which said complex impedance or impedances include at least one resonant cavity damped by a damping resistance.

8. An equalizer network as claimed in claim 7, in which said damping resistance is an adjustable resistance.

9. An equalizer network according to claim 7, including one resonant cavity substantially tuned to frequency $f_0$.

10. An equalizer network according to claim 7, including two resonant cavities respectively tuned to frequencies $f_1$ and $f_2$ located on one and the other side of $f_0$ in said band.

11. An equalizer network according to claim 1, in which at least one of said complex impedances is the input impedance of a bandpass filter having a bandpass mid-frequency equal to $f_0$ and the output of which is closed on a termination resistance the value of which differs from the output wave impedance of said filter.

12. An equalizer network according to claim 11, in which the input of said filter is constituted by one end of a wave guide length along which are coupled at spacings resonant cavities substantially tuned to frequency $f_0$, while an end cavity also substantially tuned to frequency $f_0$ is coupled to the other end of said guide length, said end cavity being damped by said termination resistance.

13. An equalizer network according to claim 12, in which said termination resistance is an adjustable resistance.

14. An equalizer network according to claim 12, in which said spacings are substantially equal to odd integer multiples of the phase wave length in said guide length taken at frequency $f_0$.

15. An equalizer network according to claim 12, in which said termination resistance is in parallel connection with an adjustable reactance.

16. An equalizer network according to claim 15, in which said adjustable reactance consists of a further length of wave guide terminated by a movable short-circuit piston.

17. An equalizer network according to claim 1, in which at least one of said complex impedances is the input impedance of a bandpass filter having a bandpass mid-frequency equal to $f_0$, and in which the input of said filter is constituted by one end of a short wave guide length, the other end of which is coupled to the first of a plurality of resonant cavities substantially tuned to frequency $f_0$ and each of which is coupled to the next one, while the last of said cavities is damped by a termination resistance.

18. An equalizer network according to claim 17, in which said termination resistance is an adjustable resistance.

19. An equalizer network according to claim 17, in which said termination resistance is in parallel connection with an adjustable reactance.

20. An equalizer network according to claim 19, in which said adjustable reactance consists of a further length of wave guide terminated by a movable short-circuit piston.

References Cited by the Examiner

UNITED STATES PATENTS

| | | | |
|---|---|---|---|
| 2,151,118 | 3/1939 | King et al. | 333—98 X |
| 2,954,536 | 9/1960 | Muller | 333—73 |
| 3,089,101 | 5/1963 | Chait et al. | 333—24.2 X |
| 3,136,950 | 6/1964 | Mackey | 333—1.1 X |
| 3,142,028 | 7/1964 | Wanselow | 333—83 X |

OTHER REFERENCES

"A Microwave Ferrite Frequency Separator," Rapaport, IRE Transactions on Microwave Theory and Techniques, vol. MTT, Jan. 6, 1958, No. 1 TK 7800 I23, pages 53–58.

"Principles and Applications of Waveguide Transmission," Southworth, D. Van Nostrand, N.Y., 1961, QC 661 S68, page 300.

"Introduction to Microwaves," Wheeler, Prentice-Hall, November 1963, TK 7870 W38, pages 155 to 158.

ELI LIEBERMAN, *Primary Examiner.*

M. NUSSBAUM, *Assistant Examiner.*